United States Patent
Reinshaus (10) Patent No.: US 11,885,659 B2
(45) Date of Patent: Jan. 30, 2024

(54) METHOD FOR COMPENSATING THE INFLUENCE OF THE REYNOLDS NUMBER ON THE MEASUREMENT OF A CORIOLIS MASS FLOW METER, AND CORRESPONDING DEVICE

(71) Applicant: ROTA YOKOGAWA GMBH & CO. KG, Wehr (DE)

(72) Inventor: Peter Reinshaus, Wehr (DE)

(73) Assignee: ROTA YOKOGAWA GMBH & CO. KG, Wehr (DE)

( * ) Notice: Subject to any disclaimer, the term of this patent is extended or adjusted under 35 U.S.C. 154(b) by 122 days.

(21) Appl. No.: 17/654,644

(22) Filed: Mar. 14, 2022

(65) Prior Publication Data
US 2022/0291033 A1    Sep. 15, 2022

(30) Foreign Application Priority Data
Mar. 15, 2021 (DE) .................. 10 2021 202 464.5

(51) Int. Cl.
G01F 1/84    (2006.01)
G01F 15/02    (2006.01)
G01F 25/10    (2022.01)

(52) U.S. Cl.
CPC .......... G01F 1/8436 (2013.01); G01F 1/8422 (2013.01); G01F 15/02 (2013.01); *G01F 25/10* (2022.01)

(58) Field of Classification Search
CPC ......... G01F 1/8436; G01F 15/02; G01F 25/10
See application file for complete search history.

(56) References Cited

U.S. PATENT DOCUMENTS 6,513,393 B1    2/2003 Eckert et al.
7,000,463 B1 *    2/2006 Shajii .................... G01F 1/6847
                                                      73/202.5
(Continued)

FOREIGN PATENT DOCUMENTS

CN    110582689    12/2019
CN    11854862    10/2020
(Continued)

OTHER PUBLICATIONS

Office Action from related Chinese Application No. 202210228660.X, dated Jan. 10, 2023.
(Continued)

*Primary Examiner* — Erika J. Villaluna
(74) *Attorney, Agent, or Firm* — Grossman, Tucker, Perreault & Pfleger, PLLC (57) ABSTRACT

A method for compensating the influence of at least one of the parameters from the group consisting of flow rate, viscosity, density and Reynolds number of a fluid to be measured on the measured flow rate and/or density of this fluid in a Coriolis mass flow meter with the aid of an equation using the parameters of the current Reynolds number of the fluid to be measured in the Coriolis mass flow meter, the maximum compensation value for Reynolds numbers approaching zero, the Reynolds number at which the curve of the compensation value has the largest slope, and the slope of the curve of the compensation value at the point $Re_c$. Moreover, the invention relates to a Coriolis mass flow meter with a control device for carrying out the method.

10 Claims, 8 Drawing Sheets

(56) References Cited

U.S. PATENT DOCUMENTS

| | | | |
|---|---|---|---|
| 8,931,354 | B2 | 1/2015 | Ricken et al. |
| 9,194,731 | B2 | 11/2015 | Chatzikonstantinou |
| 11,499,857 | B2 * | 11/2022 | Standiford ............ G01F 1/8427 |
| 2009/0055119 | A1 | 2/2009 | Baumoel |
| 2019/0003875 | A1 | 1/2019 | Natter et al. |
| 2020/0249062 | A1 | 8/2020 | Standiford |
| 2022/0244084 | A1 | 8/2022 | Chatzikonstantinou |

FOREIGN PATENT DOCUMENTS

| | | |
|---|---|---|
| DE | 2420896 | 11/1975 |
| DE | 102012016490 | 12/2013 |
| DE | 102019116872 | 12/2020 |
| EP | 2657659 | 10/2013 |
| WO | 2006/022742 | 3/2006 |
| WO | 2006/055314 | 5/2006 |
| WO | 2021091551 | 5/2021 |

OTHER PUBLICATIONS

Office Action from related German Appln. No. 102021202464.5, dated Nov. 30, 2021. English translation attached.

Huber et al., "Effect of Reynolds Number in Coriolis Flow Measurement", Endress+Hauser Flowtec AG, https://www.vsl.nl/sites/default/files/rtf/Paul_Ceglia_Effects_of_Reynolds_Number_on_Coriolis_Flowmeters_Paper.pdf, found Jun. 16, 2022, Reinach, Switzerland, 2013.

Kumar et al., "Numerical Simulations of Coriolis Flow Meters for Low Reynolds Number Flows", Journal of Metrology Society of India, vol. 26, No. 3, 2011, pp. 225-235.

English translation of Notice of Allowance from related Russian Application No. 2022105606, dated Sep. 5, 2022.

* cited by examiner

METHOD FOR COMPENSATING THE INFLUENCE OF THE REYNOLDS NUMBER ON THE MEASUREMENT OF A CORIOLIS MASS FLOW METER, AND CORRESPONDING DEVICE

FIELD

The invention relates to a method for compensating the influence of at least one of the parameters selected from the group consisting of flow rate, viscosity, density and Reynolds number of a fluid to be measured on the measured flow rate and/or measured density of that fluid in a Coriolis mass flow meter. Moreover, the invention relates to a Coriolis mass flow meter with a control device configured to carry out the method.

BACKGROUND

Generic Coriolis mass flow meters are known, for example, from EP 2 657 659 A1 or DE 10 2012 016 490 A1. They are employed in various industries to measure mass flow, or flow rate, and/or density of a fluid. Known Coriolis mass flow meters comprise a housing with an inlet and an outlet for a substance to be measured, or a fluid medium, i.e. the fluid to be measured. Moreover, the Coriolis mass flow meter comprises at least one measuring tube configured to allow the fluid to be measured to flow through it and arranged between the inlet and the outlet. The measuring tube may lead the substance to be measured from the inlet to the outlet via various paths, for example, the measuring tube may be arcuate, U-shaped or straight. The measuring tube itself is selected depending on the respective application, for example, with a large diameter for large flow rates. In this manner, the Coriolis mass flow meter is adapted to the fluid to be measured and the expected volumetric flow rates.

The measurement itself is then based on the Coriolis principle. For this, the Coriolis mass flow meter comprises a vibration exciter configured to cause vibration, preferably resonant vibration, of the measuring tube. The exciter may be configured, for example, as an electromagnetic driving coil and magnet. Moreover, two vibration sensors are provided for detection of the movements of the measuring tube, which are, for example, arranged on the measuring tube, preferably on different sides of the vibration exciter, spaced apart from each other along the flow direction of the measuring tube. Due to the vibration of the measuring tubes induced by the exciter, Coriolis forces act on the fluid flowing inside the measuring tube, which lead to a phase shift of the vibration detected by the vibration sensors. Based on this phase shift, conclusions can be drawn regarding the mass flow or flow rate of the fluid flowing through the measuring tube. The density of the substance to be measured can be derived from the frequency of the resonant vibration of the measuring tube. Coriolis mass flow meters are characterized by high precision and particularly flexible applications, which is why they are widely used and employed for measuring a large variety of fluids.

Coriolis mass flow meters generally use a linear relationship between the described phase shift and the mass flow or flow rate of the fluid to be measured flowing through the device. Mass flow and flow rate can be converted into each other via the density of the fluid and are therefore considered synonymous herein. The measured values of the Coriolis mass flow meters typically deviate only very slightly from the respective actual value, for example by no more than 0.1% or even no more than 0.05%. To be able to guarantee such accurate measurements, possible interfering factors must be eliminated as far as possible. For example, it was found that the linear relationship described is affected by variations, in particular strong variations, in the flow velocity and the flow state, expressed by the Reynolds number, of the fluid to be measured in the Coriolis mass flow meter. This applies both to cases where the Reynolds number of the fluid to be measured varies greatly during operation, and to cases where the actual Reynolds number during operation differs from that Reynolds number or range of Reynolds numbers in which the Coriolis mass flow meter was calibrated. In this regard, one problem is that it is difficult in practice to experimentally realize many different magnitudes of the Reynolds number for calibration of the Coriolis mass flow meter. Calibration is therefore either carried out over only a partial range of possible Reynolds numbers in operation or requires a great amount of time and an extremely high effort, also in terms of the necessary apparatus, in order to create the corresponding operating states, especially for low Reynolds numbers. The distortion of the measurement results triggered by a variation of the Reynolds number occurs especially with large Coriolis mass flow meters and/or fluids with high viscosity. The distortion depends strongly on the viscosity, density and flow rate of the fluid to be measured, which are parameters of the Reynolds number.

In practice, the aim is to minimize the influence of the Reynolds number or the variables determining the Reynolds number. Here, Reynolds numbers of <1 up to $10^5$ and even larger values typically have to be considered. The mass flow or flow rate measurement is typically calibrated with water at high flow rates. Therefore, high Reynolds numbers occur during this process, for example $10^6$ or more. In the range of high Reynolds numbers, the values measured by the Coriolis mass flow meter are therefore typically correct and do not need to be corrected. However, in the range of Reynolds numbers smaller than $10^6$, corrections must be made to the measured value. Since in this range the values measured by the Coriolis mass flow meter are typically lower than the actual value, a correction value is added to the measured value calculated from the linear relationship with the phase shift. In order to determine the most suitable correction value, tests are carried out on the Coriolis mass flow meters, for example at different flow rates as well as with fluids of different viscosities, in particular significantly higher viscosities than water. Based on these tests, tables of values are then created, for example, or functions are proposed that are only correct in each case over a small subrange of possible Reynolds numbers and are therefore only used in these ranges. During operation, a variety of different factors are then used, for example the drive power of the Coriolis mass flow meter, the viscosity of the fluid to be measured or the pressure drop across the Coriolis mass flow meter, to name just a few, to obtain the correction value actually required for the current case from the tables or the functions defined by range. However, both the tables and the functions defined by range always apply only to those ranges of Reynolds numbers in which they were actually tested. This means that there is a significant amount of work involved in creating the tables and functions, especially across the entire range of interest. Especially in the range of low Reynolds numbers (for example <10), this turns out to be extremely complex or even impossible.

Against this background, it is the object of the present invention to provide a way to reliably reduce the influence of the Reynolds number or the parameters determining the Reynolds number on the measurement result of a Coriolis mass flow meter without leading to excessive calibration efforts. In particular, the accuracy of the measurement should be improved and the associated costs should be reduced.

SUMMARY

Specifically, in a method mentioned at the beginning, the object is achieved by determining a compensation value Mf(Re) for the flow rate or the mass flow and/or the density of the fluid to be measured using the following equation:

$$M_f(Re) = \frac{f_{max}}{2} \cdot \left\{ 1 - \tanh\left( -\frac{2}{f_{max}} \cdot \frac{dM_f}{d(\log_{10}Re)}\bigg|_{Re=Re_c} \right.\right.$$
$$\left.\left. [\log_{10}(Re) - \log_{10}(Re_c)] \right) \right\} \quad (1)$$

Here $f_{max}$ is the maximum compensation value for Reynolds numbers Re approaching zero, $Re_c$ is the Reynolds number at which the curve of the compensation value has the largest slope, and $$\frac{dM_f}{d(\log_{10}Re)}\bigg|_{Re=Re_c}$$

is the slope of the curve of the compensation value at the point $Re_c$. Therefore, the following also applies in particular:

$$f_{max} = \lim_{Re \to 0}(M_f(Re)) \text{ or } \frac{f_{max}}{2} = M_f(Re)\bigg|_{Re=Re_c} \quad (2)$$

and $$Re_c = \max_{Re \to Re_c}\left( \frac{dM_f}{d(\log_{10}Re)}\bigg|_{Re=Re_c} \right) \quad (3)$$

Equations (2) and (3) merely explain in more detail the definition of the parameters $f_{max}$ and $Re_c$ used in equation (1).

Furthermore, in the method according to the invention, the value measured by the Coriolis mass flow meter for the flow rate or the mass flow and/or the density of the fluid to be measured is corrected by the compensation value $M_f(Re)$ calculated with equation (1).

The invention is based on the finding that equation (1) provides reliable values for the deviation of the value measured by the Coriolis mass flow meter from the actual value across all possible Reynolds numbers, for example, from a Reynolds number of near zero to a Reynolds number of $10^7$ or far beyond, basically to infinity. This means that for each Reynolds number of the fluid to be measured flowing through the Coriolis mass flow meter, a compensation value $M_f(Re)$ can be calculated from equation (1) via which the influence of the Reynolds number on the measured value can be compensated. Thus, the function defined by equation (1) provides a compensation value for the measurement result across all relevant Reynolds numbers. It is therefore no longer necessary to create values for all relevant Reynolds numbers and to store them in tables when calibrating a Coriolis mass flow meter. Also, it is no longer necessary to use functions defined or valid only for certain ranges of Reynolds numbers. With the function according to equation (1), the appropriate compensation value for each individual Reynolds number can be calculated from only a few parameters, and a corrected measured value for the current application of a particular Reynolds number can be determined. By providing an exact compensation value that fits the current Reynolds number, the overall measurement result is improved and accuracy is increased because there are no more predetermined compensation steps that would occur, for example, due to the necessary granularity between two compensation values of a table. In other words, the invention provides continuous compensation values instead of the previously used discrete compensation values, which increases accuracy.

Generally, it is possible for the method according to the invention to be carried out outside the Coriolis mass flow meter or also, for example, with a time offset from its operation. For example, compensation for the influence of the at least one parameter of said group may be applied retrospectively to stored raw data provided by the Coriolis mass flow meter. This may be done, for example, on a computer that receives the raw data from the Coriolis mass flow meter but is external to the latter, for example as a central server. Preferably, however, the determination of the compensation value and the correction of the measured value are performed by a control device of the Coriolis mass flow meter during operation of the Coriolis mass flow meter. The control device of the Coriolis mass flow meter is in this case a component of the Coriolis mass flow meter itself, so that the latter is altogether capable of providing measured values already corrected according to the invention. In this way, no post-processing of the supplied data is necessary and an operator, without having to think or act further about this, immediately gets the correct values directly via the output of the Coriolis mass flow meter.

Generally, various computational possibilities are conceivable by means of which a correction of the measured value could be performed via the compensation value determined through equation (1). According to a preferred embodiment, for correcting the measured value, the compensation value is interpreted as a relative deviation of the measured value, for example as a percentage, in particular as a negative relative deviation, and the absolute deviation determined from this is added to the measured value. Equation (1) thus provides, for example, a negative value which, multiplied by 100, indicates a percentage of the measured value by which it is too low. Thus, a value $q_m^*$ measured by the Coriolis mass flow meter that has not yet been corrected with respect to the influence of the Reynolds number Re could be corrected, for example, as follows:

$$q_m(Re) = q_m^* \cdot (1 - M_f(Re)) \quad (4)$$

Wherein $q_m(Re)$ is the measured value of the Coriolis mass flow meter corrected with respect to the influence of the Reynolds number Re, while $q_m^*$ denotes the measured value not yet corrected. Thus, in equation (4), the correction value $M_f(Re)$ obtained from equation (1) is used to perform the correction of the value measured by the Coriolis mass flow meter in a simple way.

Thus, in order to perform the Reynolds number-dependent correction of the value measured by the Coriolis mass flow meter, it is necessary to know the current Reynolds number of the fluid flowing through the mass flow meter. As known to the skilled person, the Reynolds number is basically dependent on the geometry of the Coriolis mass flow meter, for example the pipe diameter, as well as the flow velocity, viscosity and density of the fluid to be measured. The Reynolds number may therefore be specified for a particular application. In this case, a one-time determination of the compensation value via equation (1) is sufficient, which can then be used over the duration of the operation with this Reynolds number. Typically, however, Coriolis mass flow meters are used in operating situations with varying Reynolds numbers (particularly due to the varying flow rate). It is therefore preferred that an acquisition of the value of a current Reynolds number of the fluid to be measured is carried out in the Coriolis mass flow meter, in particular during operation. The acquisition of the current Reynolds number according to the invention may be performed, for example, by specifying the Reynolds number of the fluid currently to be measured under the current operating conditions, for example, by an operator or a control device, which may be, for example, the control device of the Coriolis mass flow meter or an external control device communicating with the Coriolis mass flow meter. Alternatively, the acquisition of the current Reynolds number according to the invention may be done by calculating it, for example by the control device of the Coriolis mass flow meter. For this purpose, for example, parameters are used that are known a priori, such as the geometry of the Coriolis mass flow meter. In addition, for example, the flow velocity and/or the density of the fluid to be measured, which can be determined by the Coriolis mass flow meter itself, may also be used. The viscosity, in turn, may be specified by an operator or an external control device, for example. At least the influence of the flow velocity and/or the density of the fluid to be measured on the Reynolds number can be continuously monitored during operation of the Coriolis mass flow meter by the control device of the mass flow meter itself. For example, the values for the Reynolds number can be automatically adjusted if deviations are detected in the flow velocity and/or density of the fluid to be measured. In this case, the acquisition of the value of the current Reynolds number is also performed continuously during operation of the Coriolis mass flow meter, in order to ensure the most accurate correction values and thus measurement results in real time.

In addition to the current value of the Reynolds number Re, equation (1) also includes the other parameters $f_{max}$, $Re_c$ and $$\left.\frac{dM_f}{d(\log_{10}Re)}\right|_{Re=Re_c}$$

are included. These may, for example, be estimated empirically from basic data of the particular application, for example the design of the Coriolis mass flow meter as well as the fluid to be measured. Once numerical values for these three parameters are fixed, equation (1) depends only on the current Reynolds number and can be used according to the invention. A preferred embodiment of the invention provides that prior to determining the compensation value, an experimental determination of the parameters $f_{max}$, $Re_c$ and $$\left.\frac{dM_f}{d(\log_{10}Re)}\right|_{Re=Re_c}$$

is carried out. This may be done, for example, as part of a calibration of the Coriolis mass flow meter. For this purpose, as usual, experiments are carried out over a range of different orders of magnitude of Reynolds numbers, for example using different fluids. It is not necessary to use the same fluid that the Coriolis mass flow meter will later be used to measure. By experimentally determining the parameters necessary to use equation (1), the accuracy of the compensation according to the invention is increased.

When experimentally determining the parameters necessary for using equation (1), another advantage of the method according to the invention now becomes apparent: Whereas in the prior art it was necessary to perform calibration tests over the entire range of possible Reynolds numbers, i.e. basically from near zero up to $10^7$ and beyond, in order to compensate as accurately as possible for the influence of the Reynolds number on the measurement results, according to the invention it is sufficient to cover a partial range of these orders of magnitude. This is due to the fact that the equation (1) according to the invention is applicable over the entire range of Reynolds numbers from zero to infinity. It therefore makes no difference in which range of the Reynolds number the parameters $f_{max}$, $Re_c$ and $$\left.\frac{dM_f}{d(\log_{10}Re)}\right|_{Re=Re_c}$$

are determined, as long as their determination is accurate enough. For example, the parameters may be determined in a range of Reynolds numbers that is easily accessible experimentally, such as a range of high Reynolds numbers. In this way, particularly complex tests with low Reynolds numbers are no longer necessary. It is therefore preferred that the experimental determination of the parameters $f_{max}$, $Re_c$ and $$\left.\frac{dM_f}{d(\log_{10}Re)}\right|_{Re=Re_c}$$

is carried out exclusively in a range in which the fluid to be measured in the Coriolis mass flow meter has a Reynolds number of the order of magnitude of $Re_c$ up to at least $10^5$. "In the order of magnitude of $Re_c$" shall mean in the present case that the lower limit of the used range is, for example, $0.5 \cdot Re_c$, preferably $0.7 \cdot Re_c$ and more preferably $0.9 \cdot Re_c$. Preferably, the range has no upper limit. It has been shown that by calibration tests where the Reynolds number is in the range described, the parameters $f_{max}$, $Re_c$ and $$\left.\frac{dM_f}{d(\log_{10}Re)}\right|_{Re=Re_c}$$

can be determined with sufficient accuracy so that no further tests in other ranges are necessary.

In addition or as an alternative to the experimental determination and/or estimation of the parameters $f_{max}$, $Re_c$ and $$\left.\frac{dM_f}{d(\log_{10}Re)}\right|_{Re=Re_c},$$

these may also be determined from computation and, in particular, simulations of the actual geometry and structure of the Coriolis mass flow meter. According to a particularly preferred embodiment, for example, prior to determining the compensation value, the parameters $f_{max}$, $Re_c$ and $$\left.\frac{dM_f}{d(\log_{10}Re)}\right|_{Re=Re_c}$$

are determined using the finite element method (FEM). Using FEM, the various parameters of the specific application may be optimized against each other numerically in a computer-aided manner. The details of the method are known to the person skilled in the art, so that a detailed description thereof is omitted here.

The method according to the invention has the further advantage that the corresponding compensation requires only a very small number of input data or parameters. Thus, information that was necessary in prior art solutions to compensate the influence of the Reynolds number on the measurement result, such as the drive power or the pressure drop at the Coriolis mass flow meter, are no longer required. Therefore, in order to keep the method as uncomplicated as possible and to be able to carry it out quickly and easily, according to a preferred embodiment, in order to compensate for the influence of the at least one parameter of the group consisting of flow rate, viscosity, density and Reynolds number of a fluid to be measured on the measured flow rate and/or density of this fluid in a Coriolis mass flow meter, only the current Reynolds number Re, $f_{max}$, $Re_c$ and $$\left.\frac{dM_f}{d(\log_{10}Re)}\right|_{Re=Re_c}$$

are used as input parameters. Of course, the uncorrected value measured by the Coriolis mass flow meter is also used. However, the compensation according to the invention is preferably carried out exclusively via equations (1) and (4).

As described above, it is preferred that the determination of the compensation value is performed during operation of the Coriolis mass flow meter, for example by its control device. However, the method according to the invention offers advantages even if the determination is not performed by the control device of the Coriolis mass flow meter. Thus, according to a preferred embodiment of the invention, the determination of the compensation value for a plurality of Reynolds numbers may be carried out before the Coriolis mass flow meter is put into operation and the determined compensation values are recorded in a memory, and a control device of the Coriolis mass flow meter may fetch the compensation values from the memory during operation of the Coriolis mass flow meter and the correction of the measured value may be carried out based on these compensation values. The memory may be, for example, an electronic memory of the control device of the Coriolis mass flow meter. In other words, before operating the Coriolis mass flow meter, a table is created with a plurality of predetermined compensation values, but all obtained from equation (1). This table is then used during operation by the control device taking the relevant compensation value corresponding to the current value of the Reynolds number from the table and using it to correct the measured value. If the current Reynolds number lies between two Reynolds numbers for which compensation values are stored in the table, a compensation value lying between these compensation values can be determined mathematically, for example by linear interpolation. Even in this case, only a fraction of the calibration attempts are necessary. At the same time, equation (1) can be used to determine any number of compensation values that are arbitrarily close to each other, so that the accuracy of a corresponding compensation based on the tables of the prior art is exceeded.

The above-mentioned object is further achieved with a Coriolis mass flow meter, comprising a housing with an inlet and with an outlet for a fluid medium, at least one measuring tube configured to allow the fluid medium to flow through it and arranged between the inlet and the outlet, a vibration exciter configured to set the at least one measuring tube into vibration, two vibration sensors for detecting the measuring tube movements, and a control device, the control device being configured to carry out the method described above. The control device is, for example, the electronic control device already typically provided in Coriolis mass flow meters, which, for example, controls the vibration exciter, receives the measurement results from the vibration sensors and uses them to determine the specific measured value, for example the mass flow, the flow rate, and/or the density of the fluid to be measured.

All of the above features, advantages and effects of the method according to the invention apply mutatis mutandis to the Coriolis mass flow meter according to the invention and vice versa. Therefore, to avoid repetitions, reference is made to the respective other statements.

BRIEF DESCRIPTION OF THE DRAWINGS

The invention will be explained in more detail below by reference to the embodiment examples shown in the figures. In the schematic figures.

DETAILED DESCRIPTION

Like parts, or parts acting in a like manner, are designated by like reference numerals. Recurring parts are not designated separately in each figure.

Figure 1:
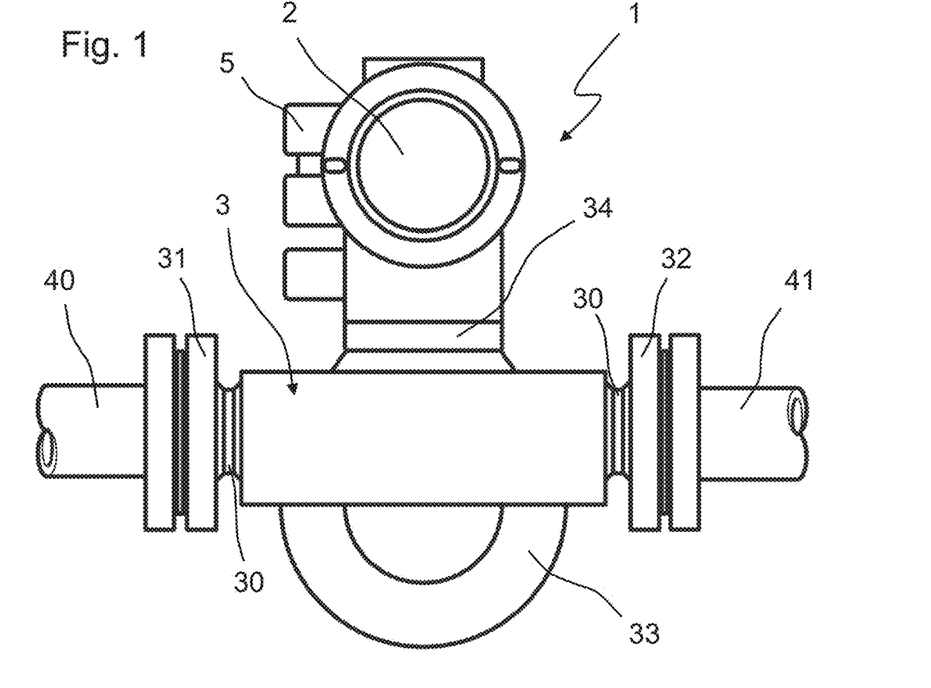
FIG. 1: is a side view of a Coriolis mass flow meter.

FIG. 1 shows a Coriolis mass flow meter 1 with a transmitter 2 and a housing 3. The transmitter 2 of the Coriolis mass flow meter 1 accommodates the electronics inter alia for the vibration exciter and the vibration sensors. It is connected to the housing 3 via a neck 34. In the present case, a control device 5 is configured to carry out the method according to the invention. For this purpose, it comprises in particular a data memory in which, for example, equation (1) and various values, for example for the parameters $f_{max}$, $Re_c$ and $$\left. \frac{dM_f}{d(\log_{10}Re)} \right|_{Re=Re_c}$$

determined during calibration, are stored. During operation, the Coriolis mass flow meter 1 with its housing 3 is fitted into a pipeline transporting the fluid to be measured. More particularly, the Coriolis mass flow meter 1 includes connectors 30, which in turn include an inlet 31 for connection to a supply line 40 and an outlet 32 for connection to a discharge line 41 of the pipeline.

Figure 2:
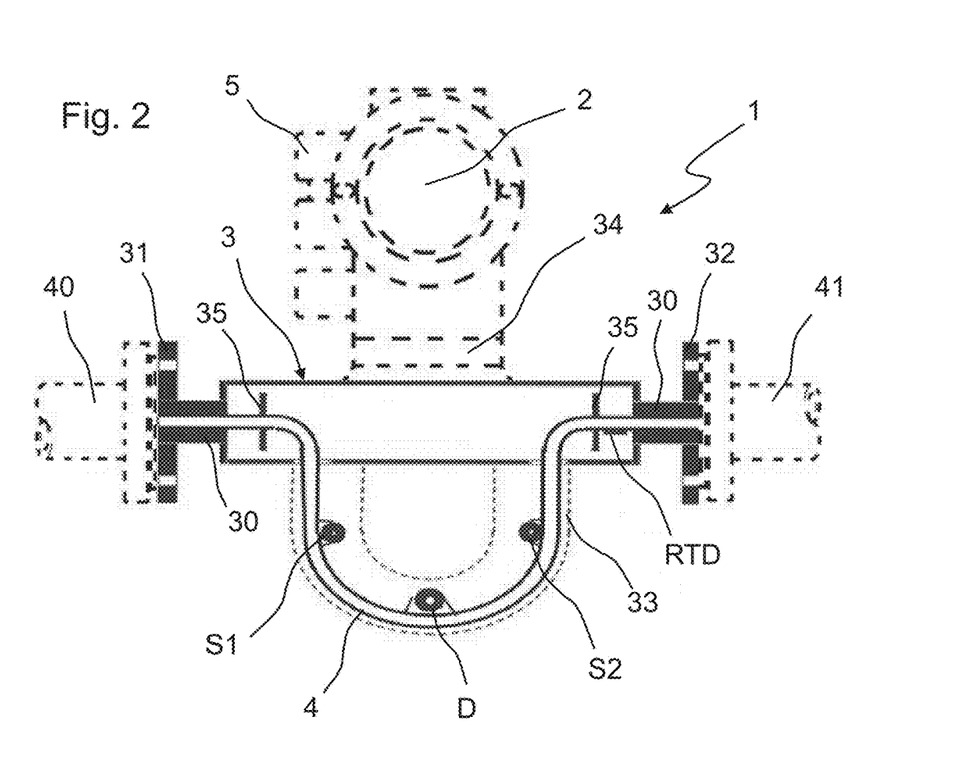
FIG. 2: shows the measuring tube inside the housing of the Coriolis mass flow meter according to FIG. 1.

Moreover, as shown in FIG. 2, the Coriolis mass flow meter 1 has a tube housing 33 in which two measuring tubes 4 are housed, one of which is not visible in the figure because it is located behind and covered by the other one. FIG. 2 also shows the progression of the measuring tubes 4 through the housing 3 from the inlet 31 via the tube housing 33 to the outlet 32. The progression of the measuring tubes 4, which is U-shaped in the example shown, also defines the flow direction of the fluid inside the measuring tube 4 and thus inside the Coriolis mass flow meter 1. The measuring tubes 4 are fixed by a respective fixing element 35 in both the region of the inlet 31 and the region of the outlet 32, said fixing element being configured as a gusset plate in the present example. As can also be seen from FIG. 2, a vibration exciter D is arranged on the measuring tube 4, which in operation of the Coriolis mass flow meter 1 is employed to set the measuring tubes 4 into vibration, in particular resonant vibration. In FIG. 2, the vibration excited by the vibration exciter D is directed into and out of the paper plane, respectively. A first vibration sensor S1 and a second vibration sensor S2 are arranged on the measuring tubes 4 in the flow direction upstream and downstream of the vibration exciter D, respectively. The vibration sensors S1, S2 detect the movements of the measuring tubes 4 and in particular the vibration induced by the vibration exciter D. Moreover, a temperature sensor RTD is arranged on the measuring tubes 4, which is, for example, configured as a resistance thermometer.

Figure 3:
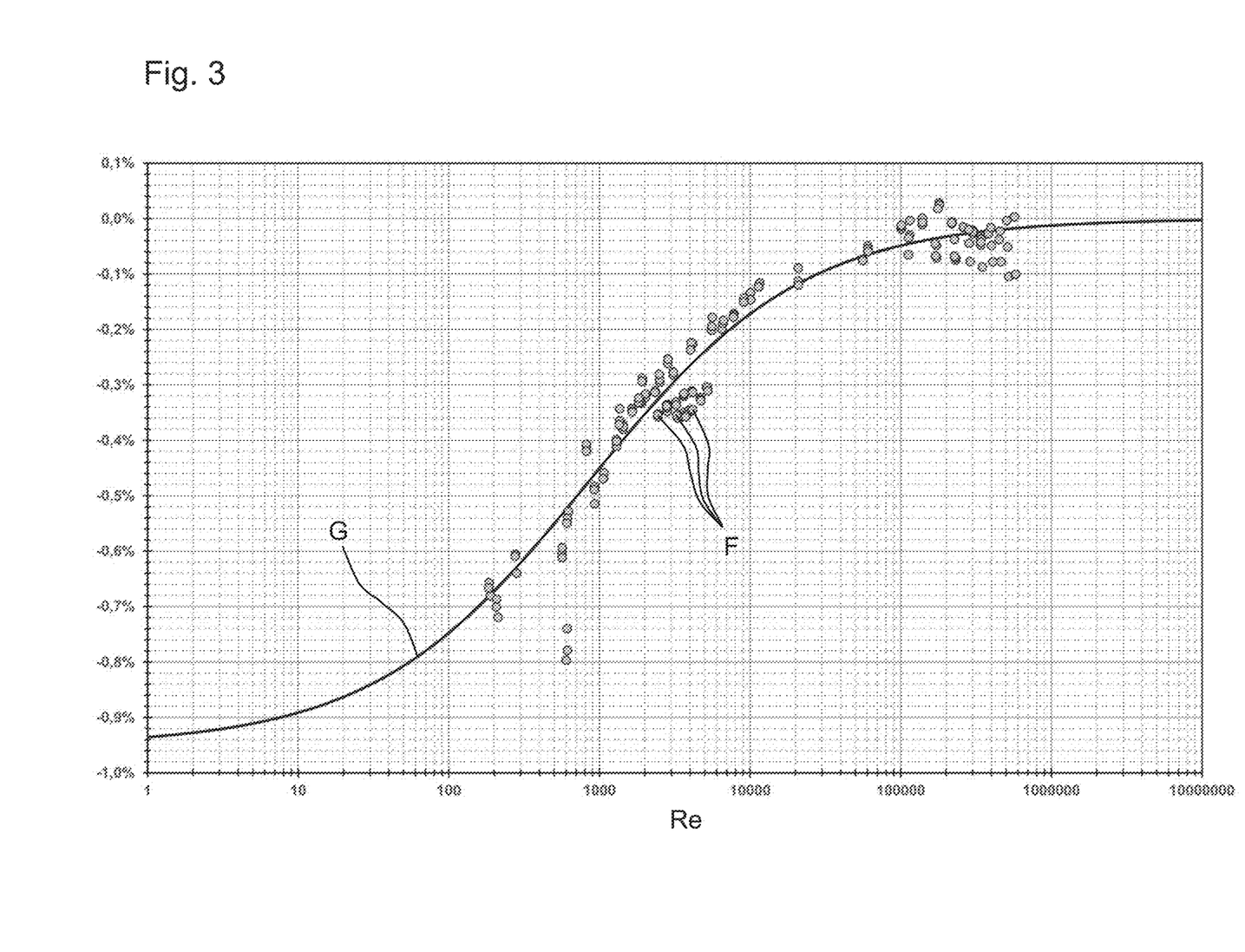
FIG. 3: is a diagram with exemplary measured value deviations and the graph of the compensation function according to equation (1)

FIG. 3 shows a diagram illustrating the relationship between the deviation of the value measured by the Coriolis mass flow meter 1 and equation (1). The abscissa of the diagram shows the dimensionless Reynolds number Re, the ordinate shows the deviation of a measured value from the actual value in percent. The plotted points F show the deviation of values measured on a specific example of a Coriolis mass flow meter 1 for the flow rate or mass flow or the density of the fluid to be measured from the respective actual value. Since the measured values were obtained in a calibration or test setup, the actual values are known, so that the deviation of the individual values measured at the respective Reynolds number Re can be given as points F. In the present experiment, the Reynolds numbers Re for which measured values were obtained ranged approximately between $10^2$ and $10^6$. If the values measured by the Coriolis mass flow meter 1 were independent of the Reynolds number Re, the points F would all have to lie on the horizontal line at 0.0% deviation or scatter symmetrically around this line due to other influencing factors. However, as can be seen from the distribution of points F of the respective measured value deviations, this is not the case. More specifically, the measured values deviate more and more from the actual value with decreasing Reynolds numbers Re. As can also be seen from FIG. 3, the Coriolis mass flow meter 1 increasingly underestimates the actual values for small Reynolds numbers Re, i.e. the relative measured value deviation in percent takes on increasingly negative values as the Reynolds number Re approaches zero. It can also be seen that the measured value deviations for large Reynolds numbers Re become smaller and smaller, i.e. the measured values come closer and closer to the actual value and therefore scatter around the zero line as expected. As mentioned earlier, this is due to the fact that the Coriolis mass flow meter 1 is typically calibrated in operation with high Reynolds numbers Re, since these are easier to realize experimentally.

The function according to equation (1) can now be fitted to the distribution of the points F of the measured value deviations. How such a fit must be performed is known to the skilled person and therefore does not need to be explained in more detail here. From the fit, specific numerical values can be obtained for the parameters used in equation (1). For example, in the specific example shown in FIG. 3, the fit yields the values $f_{max}=-0.00951$, $Re_c=842$, and $$\left. \frac{dM_f}{d(\log_{10}Re)} \right|_{Re=Re_c} = 0.00334.$$

The graph G obtained with these values from equation (1) is also shown in FIG. 3. The graph G follows the distribution pattern of the points F of the measured value deviations and satisfies the requirements found in experimental observations: For a Reynolds number Re approaching zero, the graph G approaches a maximum (negative) measured value deviation $f_{max}$ (see also FIG. 4). For very high Reynolds numbers Re, on the other hand, the graph G approaches zero. Using equation (1), a function has thus been found that covers the measured value deviations over the entire range of Reynolds numbers Re from zero to infinity. It is therefore irrelevant in which range of Reynolds numbers Re the parameters of the function are determined. As long as the corresponding determination is sufficiently accurate, equation (1) may also be used to accurately determine the measured value deviation of the Coriolis mass flow meter 1 in other ranges of Reynolds numbers Re. For this purpose, it is not necessary to also perform experiments in the ranges of Reynolds numbers Re which are difficult to realize experimentally. This leads to a considerable limitation of the calibration effort.

Figure 4:
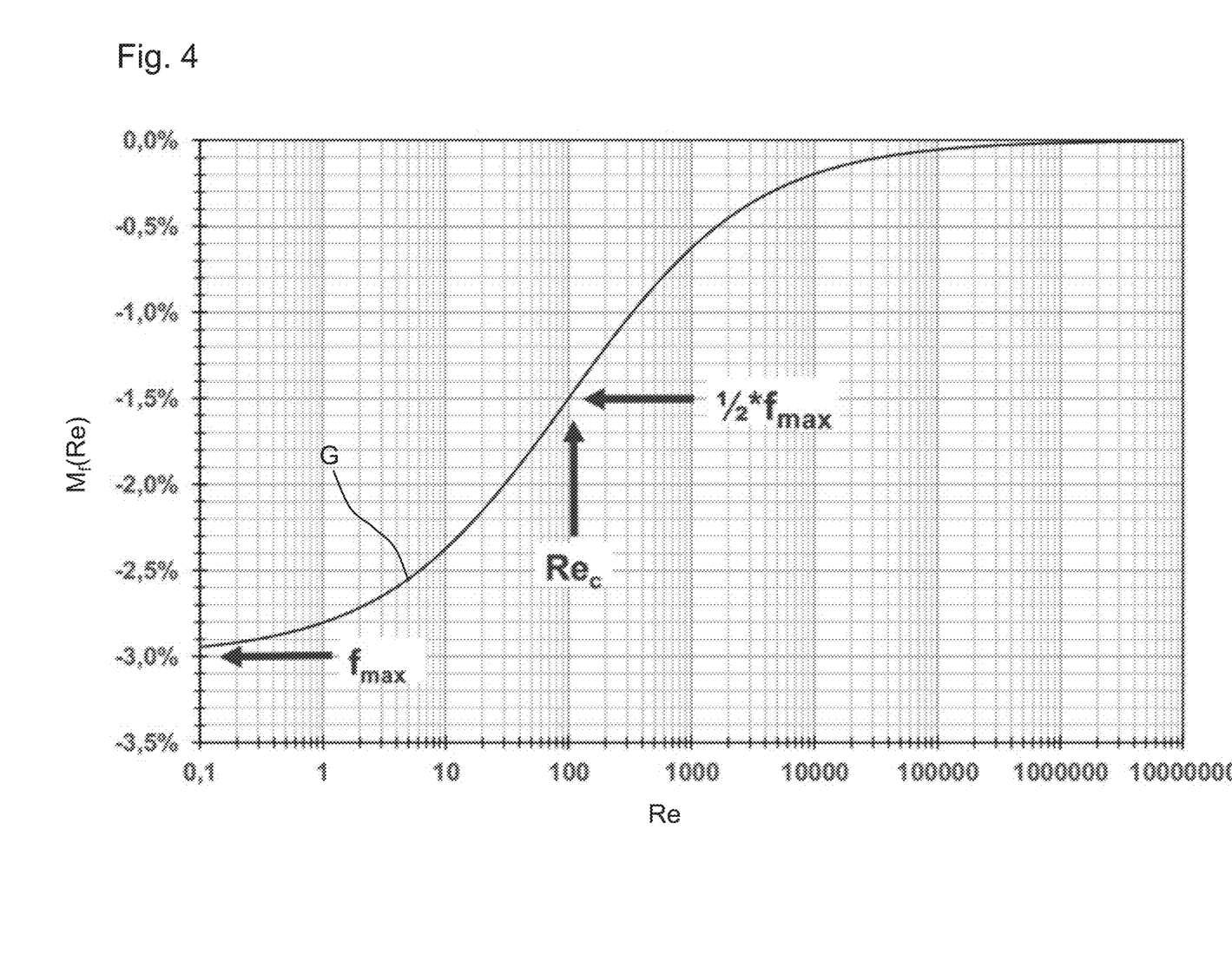
FIG. 4: is a graph of the compensation function according to equation (1) to explain various parameters.

FIG. 4 graphically illustrates various parameters of equation (1). The Reynolds number Re is plotted on the abscissa while the compensation values $M_f(Re)$ calculated from equation (1) are plotted on the ordinate. As can be seen from graph G of the function according to equation (1), $f_{max}$ denotes the maximum measured value deviation and thus the maximum compensation value $M_f(Re)$ for Reynolds numbers Re approaching zero. The Reynolds number Re at which the compensation value $M_f(Re)$ assumes half of its maximum negative value $f_{max}$ is called $Re_c$. At point $Re_c$, graph G of the function according to equation (1) has its highest slope. In other words, $$\frac{dM_f}{d(\log_{10}Re)}$$

reaches its maximum for $Re=Re_c$.

Figure 5:
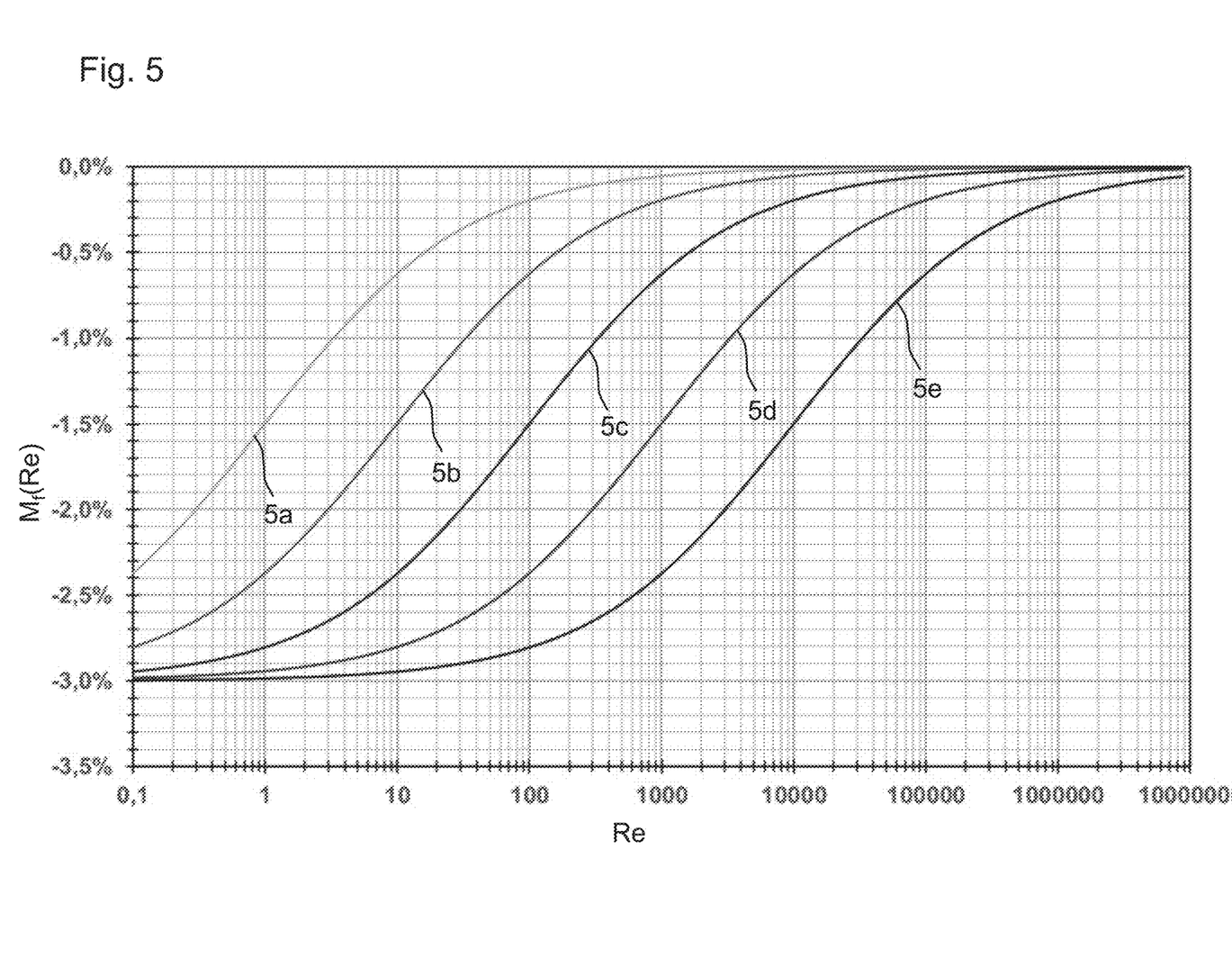
FIG. 5: is a diagram illustrating the influence of different values of $Re_c$ on the graph of the compensation function according to equation (1)
Figure 6:
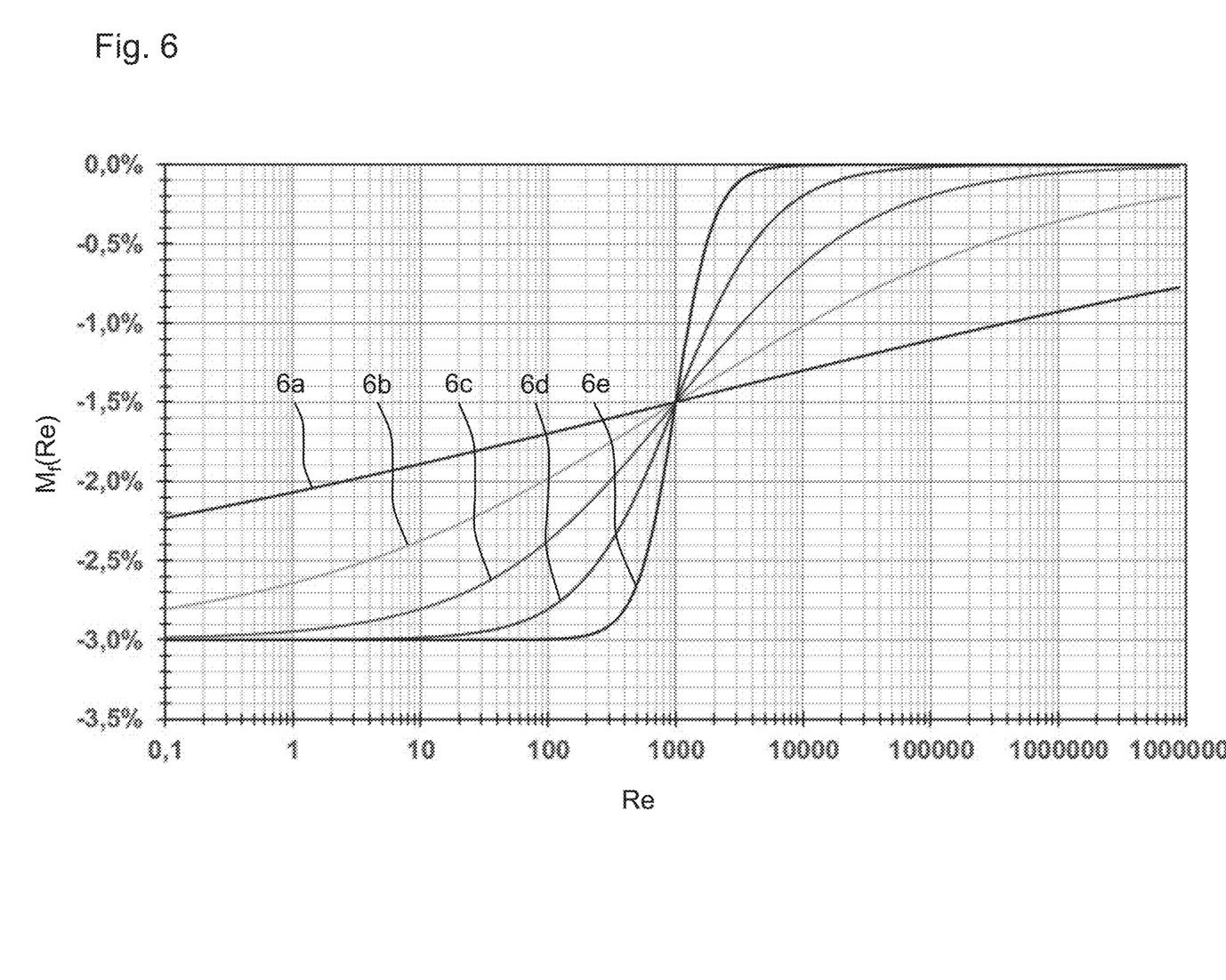
FIG. 6: is a diagram illustrating the influence of different values of the slope of the graph of the compensation function according to equation (1) at the point $Re_c$ on the graph.
Figure 7:
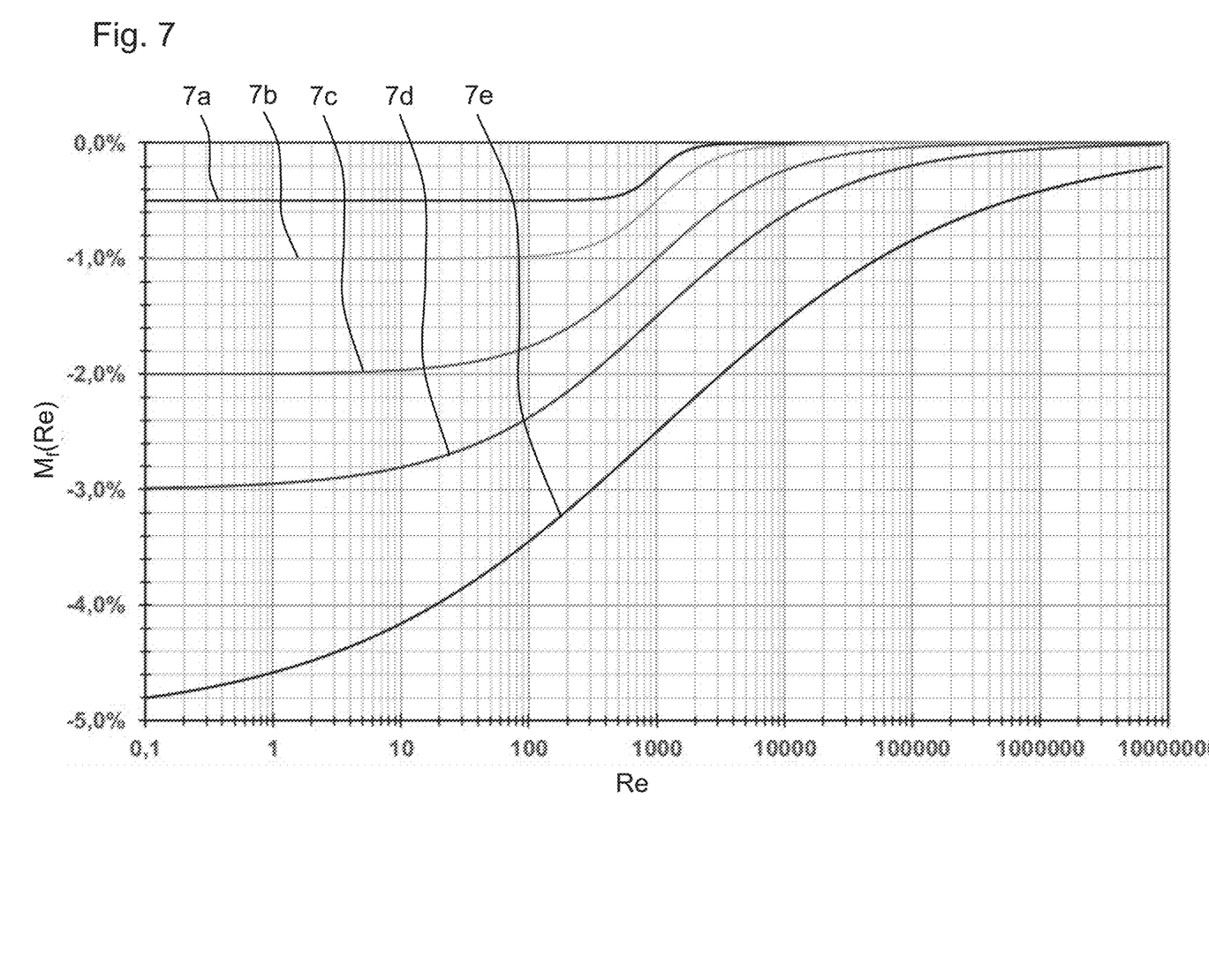
FIG. 7: is a diagram illustrating the influence of different values of $f_{max}$ on the graph of the compensation function according to equation (1)

For a better understanding of equation (1), FIGS. 5, 6 and 7 discuss the influence of parameters $f_{max}$, $Re_c$ and $$\left.\frac{dM_f}{d(\log_{10}Re)}\right|_{Re=Re_c}$$

on the graph of the function. FIG. 5, for example, shows the influence of $Re_c$. The other two parameters remain constant, i.e. in the graphs 5a to 5e shown at $f_{max}=-0.03$ and $$\left.\frac{dM_f}{d(\log_{10}Re)}\right|_{Re=Re_c} = 0.01.$$

The value of $Re_c$, on the other hand, was increased in powers of ten for graphs 5a to 5e. More specifically, for the graph according to 5a, $Re_c$ has the value 1, for 5b it has the value 10, for 5c it has the value $10^2$, for 5d it has the value $10^3$, and for 5e it has the value $10^4$. With the resulting shift of the graphs to the right on the abscissa, the regions of highest slope shift accordingly, while the limits $f_{max}$ for Reynolds numbers Re approaching zero and zero for Reynolds numbers Re approaching infinity remain the same. The value of the maximum slope also remains the same.

FIG. 6 shows the influence of different values for $$\left.\frac{dM_f}{d(\log_{10}Re)}\right|_{Re=Re_c},$$

i.e. the slope of the graph at $Re_c$. In contrast, the other two parameters are constant at $f_{max}=-0.03$ and $Re_c=10^3$. Parameter $$\left.\frac{dM_f}{d(\log_{10}Re)}\right|_{Re=Re_c},$$

on the other hand, has the value 0.002 for the graph according to 6a, 0.005 for 6b, 0.01 for 6c, 0.02 for 6d, and 0.05 for 6e. Higher slopes at $Re_c$ result in a faster approach of the compensation values $M_f(Re)$ towards the respective limits $f_{max}$ for Reynolds numbers Re approaching zero and zero for high and infinite Reynolds numbers Re, respectively.

FIG. 7 shows the influence of different values for $f_{max}$, i.e. the maximum compensation value $M_f(Re)$, which in this case is maximally negative. Again, the other two parameters are kept constant, more specifically at $Re_c=10^3$ and $$\left.\frac{dM_f}{d(\log_{10}Re)}\right|_{Re=Re_c} = 0.01.$$

The parameter $f_{max}$ considered in FIG. 7, on the other hand, has the value $-0.005$ for the graph according to 7a, $-0.01$ for 7b, $-0.02$ for 7c, $-0.03$ for 7d, and $-0.05$ for 7e. Again, maximum values of the measured value deviation or the compensation values $M_f(Re)$ closer to zero result not only in the vertical compression of the graphs but also in a correspondingly steeper approximation towards the limits $f_{max}$ for Reynolds numbers Re approaching zero and zero for Reynolds numbers Re high or approaching infinity.

Figure 8:
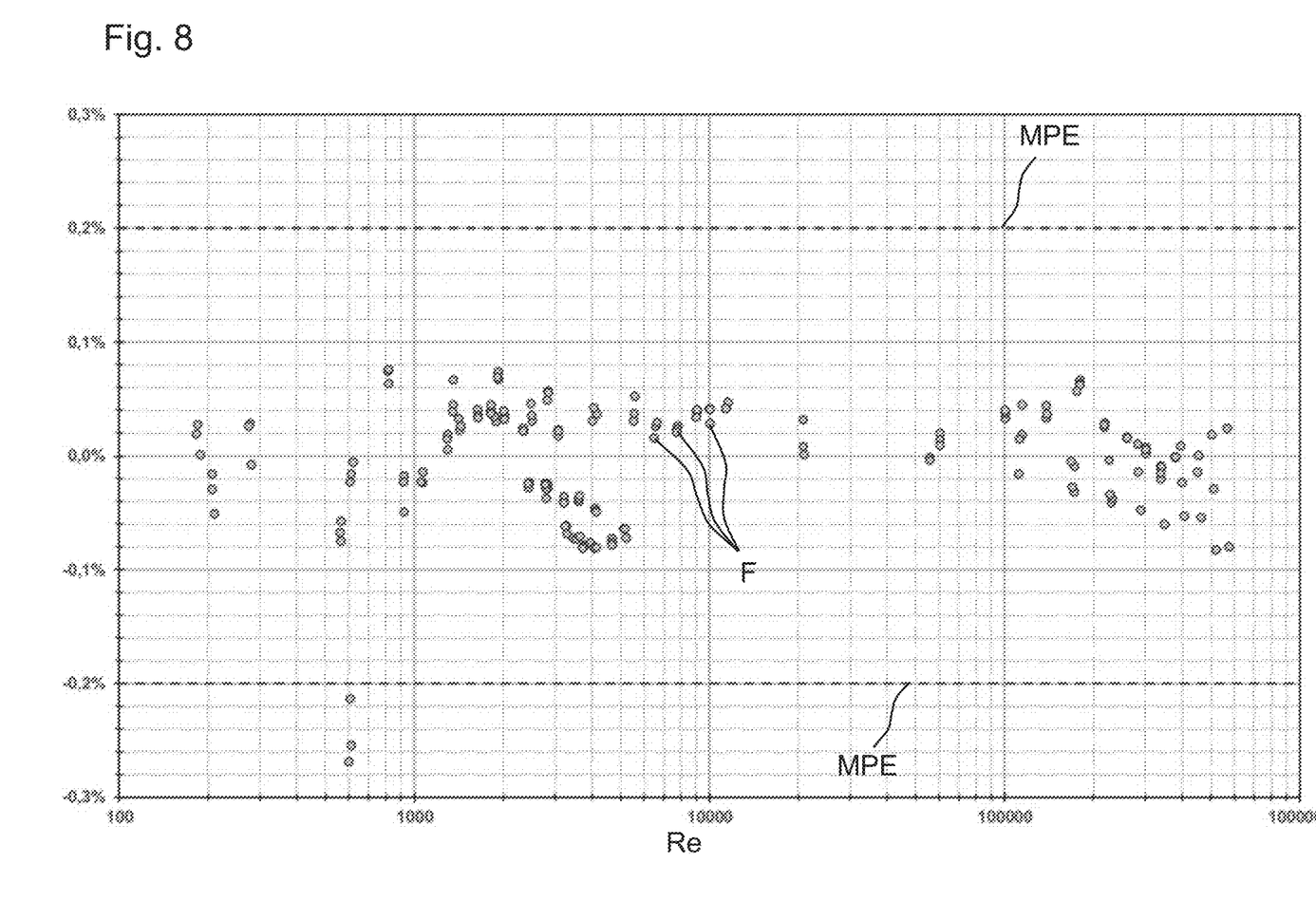
FIG. 8: is a diagram showing the corrected measured values of the example according to FIG. 3.

FIG. 8 illustrates the compensation effect of the function according to equation (1) on the particular measured example of FIG. 3. In particular, the measured values of the Coriolis mass flow meter 1 were corrected by the compensation values $M_f(Re)$ obtained from equation (1) as described above. Figuratively, graph G of FIG. 3 is used as a new zero line for the points F and this has been plotted in a new diagram. Again, the abscissa of the diagram according to FIG. 8 shows the Reynolds number Re. The deviation of the measured values from the actual value is again plotted on the ordinate. As can be seen from the plot, after correcting the measured values according to equation (1), the measured points F of the measured value deviation now all scatter around the zero line. A dependence of the measured value deviation on the Reynolds number Re can no longer be detected and was therefore compensated. Moreover, it can also be seen that all experimentally determined measured value deviations, with the exception of three outliers, are within the limits of the maximum permissible error (MPE) usual for Coriolis mass flow meters 1, in the present case ±0.2%. In fact, all measured value deviations except for the outliers are even within a limit of ±0.1%. The compensation according to the invention therefore contributes significantly to the quality of the measurement results.

Figure 9:
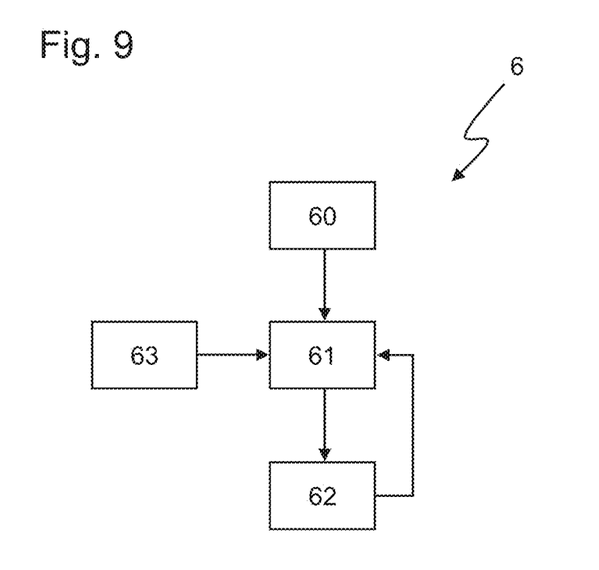
FIG. 9: is a flow chart of the method.

FIG. 9 illustrates a flow chart of the method 6 according to the invention. In the embodiment example shown, the method 6 starts with an experimental determination 60 of parameters $f_{max}$ $Re_c$ and $$\left.\frac{dM_f}{d(\log_{10}Re)}\right|_{Re=Re_c}.$$

As explained above, only measured values in an experimentally easily accessible range of Reynolds numbers Re are required for this. The determined parameters are stored, for example, in a memory of the control device 5 of the Coriolis mass flow meter 1, so that the control device 5 can access them. A determination 61 of a compensation value $M_f(Re)$ from equation (1) is then made, preferably during operation of the Coriolis mass flow meter 1, via the Reynolds number Re currently applicable for the fluid in the Coriolis mass flow meter 1. If necessary, the value of this current Reynolds number Re is also acquired 63 for this purpose, for example by receiving it from a central processing unit or an operator, or by calculating the current Reynolds number Re from parameters present in the Coriolis mass flow meter 1, made available to it or determined by it. Finally, correcting 62 the measured value of the Coriolis mass flow meter 1 is performed using the compensation value $M_f(Re)$ determined from equation (1). Determining 61 of the compensation value $M_f(Re)$ is preferably performed whenever the Reynolds number Re changes during operation of the Coriolis mass flow meter 1. Correcting 62, in turn, is performed basically continuously during operation of the Coriolis mass flow meter 1, so that each measured value recorded by the Coriolis mass flow meter 1 is corrected according to the invention. In this way, the influence of the flow rate and/or viscosity and/or density and/or Reynolds number Re on the measured values of the Coriolis mass flow meter 1 is compensated, thereby increasing the measurement accuracy, especially in the case of Reynolds numbers Re fluctuating during operation or deviating from the circumstances of the calibration. At the same time, according to the invention, it is sufficient to perform the calibration only in a range of Reynolds numbers Re that is easily accessible experimentally, thus reducing the cost of calibration.

What is claimed is:

1. A method for compensating the influence of at least one of the parameters from the group consisting of flow rate, viscosity, density and Reynolds number (Re) of a fluid to be measured, on the measured flow rate and/or density of this fluid in a Coriolis mass flow meter, comprising:

determining a compensation value ($M_f(Re)$) for the flow rate and/or density of the fluid to be measured using the following equation $$M_f(Re) = \frac{f_{max}}{2} \cdot \left\{ 1 - \tanh\left( -\frac{2}{f_{max}} \cdot \left.\frac{dM_f}{d(\log_{10}Re)}\right|_{Re=Re_c} \right.\right.$$
$$\left.\left. [\log_{10}(Re) - \log_{10}(Re_c)] \right)\right\},$$

where $f_{max}$ is the maximum compensation value ($M_f(Re)$) for Reynolds numbers (Re) approaching zero, $Re_c$ is the Reynolds number (Re) at which the curve of the compensation value ($M_f(Re)$) has the largest slope, and $$\left.\frac{dM_f}{d(\log_{10}Re)}\right|_{Re=Re_c}$$

is the slope of the curve of the compensation value ($M_f(Re)$) at the point $Re_c$, and correcting the value measured by the Coriolis mass flow meter for the flow rate and/or the density of the fluid to be measured using the compensation value ($M_f(Re)$).

2. The method according to claim 1, wherein determining the compensation value ($M_f(Re)$) and correcting the measured value is performed during operation of the Coriolis mass flow meter by a control device of the Coriolis mass flow meter.

3. The method according to claim 1, wherein for correcting the measured value, the compensation value ($M_f(Re)$) is interpreted as a relative deviation of the measured value, in particular as a negative relative deviation, and that the absolute deviation determined from it is added to the measured value.

4. The method according to claim 1, comprising acquiring the value of a current Reynolds number (Re) of the fluid to be measured in the Coriolis mass flow meter during operation.

5. The method according to claim 1, wherein determining the compensation value ($M_f(Re)$) is preceded by experimentally determining the parameters $f_{max}$, $Re_c$ and $$\left.\frac{dM_f}{d(\log_{10}Re)}\right|_{Re=Re_c}.$$

6. The method according to claim 5, wherein the experimental determining is performed exclusively in a range in which the fluid to be measured in the Coriolis mass flow meter has a Reynolds number (Re) of the order of magnitude of $Re_c$ up to at least $10^5$, in particular in a range in which the lower limit for the Reynolds number (Re) corresponds exactly to $Re_c$.

7. The method according to claim 1, wherein determining the compensation value ($M_f(Re)$) is preceded by determining the parameters $f_{max}$, $Re_c$ and $$\left.\frac{dM_f}{d(\log_{10}Re)}\right|_{Re=Re_c}$$

using the finite element method (FEM).

8. The method according to claim 1, wherein only the current Reynolds number (Re), $f_{max}$, $Re_c$ and $$\left.\frac{dM_f}{d(\log_{10}Re)}\right|_{Re=Re_c}$$

are used as input parameters for compensating the influence of the at least one parameter of the group.

9. The method according to claim 1, wherein the determining of the compensation value ($M_f(Re)$) is performed for a plurality of Reynolds numbers (Re) before the Coriolis mass flow meter is put into operation and the determined compensation values ($M_f(Re)$) are recorded in a memory, and that a control device of the Coriolis mass flow meter fetches the compensation values ($M_f(Re)$) from the memory during operation of the Coriolis mass flow meter and correcting the measured value is performed based on these compensation values ($M_f(Re)$).

10. A Coriolis mass flow meter, comprising:
 a housing with an inlet and with an outlet for a fluid medium,
 at least one measuring tube configured to allow the fluid medium to flow through it and arranged between the inlet and the outlet,
 a vibration exciter configured to set the at least one measuring tube into vibration,
 two vibration sensors for detection of the movements of the measuring tubes, and
 a control device, wherein:
  the control device is configured for carrying out the method according to claim 1.

* * * * *